Sept. 16, 1947.        B. G. CARLSON        2,427,549
GYROSCOPIC APPARATUS
Filed Aug. 8, 1942        3 Sheets-Sheet 2

INVENTOR.
BERT G. CARLSON
BY
Richey & Watts
ATTORNEYS

Sept. 16, 1947.  B. G. CARLSON  2,427,549
GYROSCOPIC APPARATUS
Filed Aug. 8, 1942  3 Sheets-Sheet 3
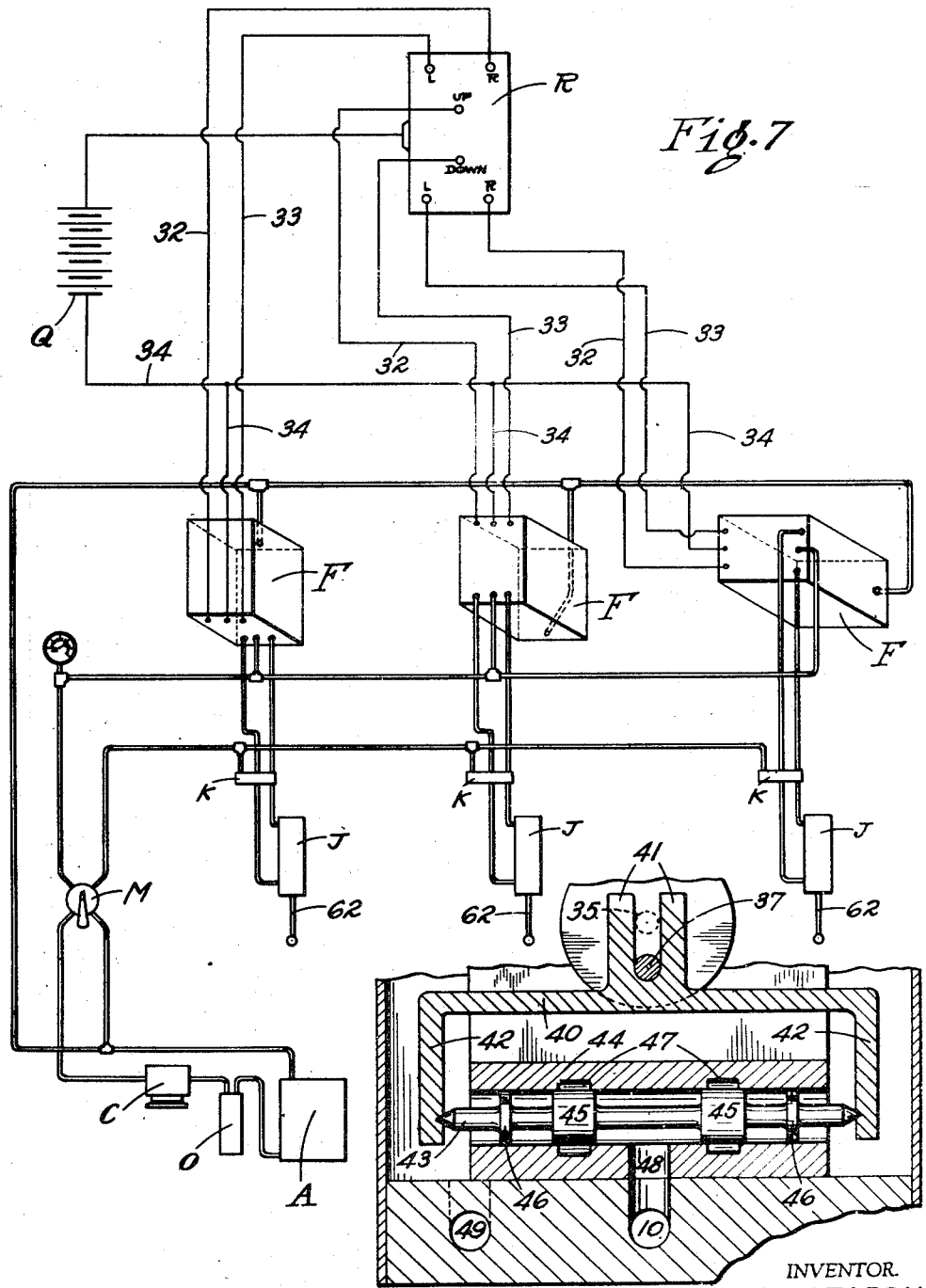
INVENTOR.
BERT G. CARLSON
BY
Richey & Watts
ATTORNEYS Patented Sept. 16, 1947

2,427,549

UNITED STATES PATENT OFFICE 2,427,549

GYROSCOPIC APPARATUS

Bert G. Carlson, Gates Mills, Ohio, assignor to The Weatherhead Company, Cleveland, Ohio, a corporation of Ohio Application August 8, 1942, Serial No. 454,155

2 Claims. (Cl. 114—144)

1

This invention relates generally to gyroscopic devices, and more particularly to an automatic pilot, including a gyroscope of the two degree freedom type.

Heretofore the rotors of gyroscopes have been rotated by means of air or electricity. These rotors had to be balanced both statically and dynamically, particularly where they were to rotate at the higher speeds. The work of dynamically balancing the rotors was tedious, time-consuming and expensive, and even when it was carefully done the rotor was only approximately in balance. This dynamic balancing may be avoided by the present invention even when the rotors are to rotate at the highest speeds. Briefly stated, this result is obtained by employing a liquid traveling at high velocity to rotate the rotor of the gyroscope.

In each of the many automatic pilots which have been used heretofore and of which I am advised a relay of some kind was disposed between the gyroscope and the direction control member, and this relay actuated the direction control member at a constant rate regardless of the amount of precession of the gimbal ring of the gyro. That is, whether the ring precessed only a small amount or the maximum amount the relay actuated the direction control member at the one rate. This rate of actuation made the action of the pilot quite sluggish and unsatisfactory. Furthermore, the actuation of the direction control mechanism was not proportional to the precession of the ring. When the ring precessed only a small amount and remained in that position a long time the relay actuated the direction control mechanism to the maximum extent. Similarly, if the ring precessed to its maximum extent and retained that position only for a short time, the relay would not actuate the direction control member to the maximum extent. This failure to actuate the direction control mechanism at a rate and to an extent proportionate to the precession of the ring made unsatisfactory the operation of the prior automatic pilots of the two degree freedom type with which I am familiar.

The present invention dispenses with the relays which prior workers in the art apparently considered to be essential and provides apparatus by which not only the expensive dynamic balancing of the rotor may be avoided but also makes it possible to actuate the direction control apparatus at a rate and to an extent which are proportional to the extent of rotation of the ring of the gyroscope.

2

In the drawings accompanying and forming a part of this specification and in which certain embodiments and modifications of the present invention are disclosed, Figure 1 shows diagrammatically an embodiment of present direction control apparatus for a single direction control member of a ship;

Figure 5 is a transverse sectional view taken on line 5—5 of Fig 2;

Figure 6 is a longitudinal sectional view, partly in elevation, of the auto by-pass of Fig. 1; and, Figure 7 is a diagrammatic view similar to Fig. 1 but including means for controlling three different direction control members of a ship.

Figure 1:
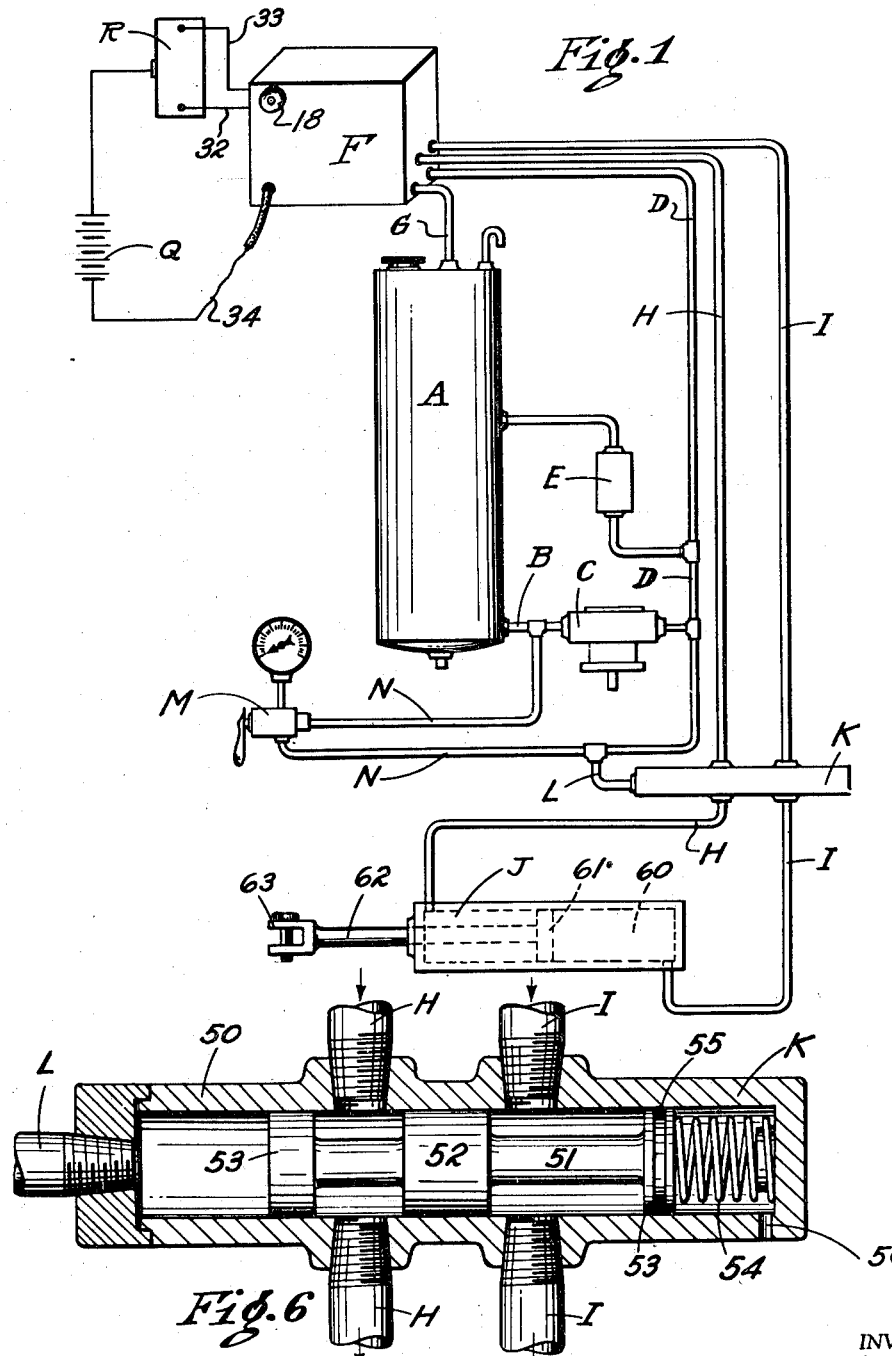

Figure 1 shows diagrammatically the combination of a hydraulic system and steering mechanism embodying the present invention for use with ships of various kinds, for example, boats, submarines, torpedoes and airplanes. The hydraulic system of Fig. 1 comprises a tank, a pump and piping leading to and from the tank. The steering control mechanism includes a gyroscope, a servo-motor, a steering member, a valve and pipe lines.

In the hydraulic system of Fig. 1, tank A is provided as a reservoir for liquid. Pipe line B connects tank A with pump C, which in turn is connected to pipe line D, which has several outlets. One outlet is thru pressure regulator E to tank A. Another outlet is thru a nozzle (Fig. 2) of the gyroscope assembly F from which assembly liquid may return to tank A thru pipe line G. Another outlet from pipe D is thru the valve (Figs. 2, 4 and 5) of the gyroscope assembly F to pipe line G and also pipe lines H and I which are connected with opposite ends of servo-motor J by way of auto by-pass K. Another outlet from pipe line D is thru line L to the cylinder of auto by-pass K and thru valve M to pipe line B by way of lines N.

The parts comprising the direction control mechanism, above briefly described, can now be described in some detail. In Fig. 1, F designates a gyroscope assembly, the details of which are better shown in Figs. 2 to 5 inclusive. This assembly, as shown, consists of a housing composed of a base or bottom 1, side walls 2, end walls 3 and a top wall 4. This housing may be supported on a rod screw-threaded in opening 5 in base 1 or on a pipe screw-threaded into that opening and connecting with the interior of tank A. Other suitable means of mounting the housing may be employed.

Within the housing a pair of brackets 6 support, on bearings, the gimbal ring 7 of a gyroscope, which ring rotatably supports the rotor 8 of the gyroscope. A nozzle 9 is connected to base 1 of the housing with the interior of the nozzle communicating thru passage 10 in base 1 with pipe D of the hydraulic system. The outlet 11 from nozzle 9 is so disposed as to direct a stream of liquid more or less tangentially against the periphery of rotor 8 and engageable with notches thereon (not shown) for rotating the rotor. At one end of the shaft-like extension 12 of gimbal ring 7 is attached a bracket 13 by means of a screw 14 which is connected to a spring 15. This spring is attached at its other end to an interiorly threaded block 16 which has screw-threaded engagement with a rod 17 rotatably mounted in the opposite side walls 2 of the housing and provided with a hand knob 18 outside of one of those walls. The rod 17 may be turned by knob 18 and the block 16 may thereby be shifted lengthwise of the rod. A compression spring 19 disposed between the bearing block 20 on the inside of one wall 2 and a washer 21 bearing against an adjacent shoulder on the rod 17 serves to prevent lengthwise movement of rod 17 by pressing a collar against bearing block 23 on the other side wall 2 of the housing.

The function of spring 15 is to return the ring to its neutral position from positions on either side thereof and to exert forces on the ring which oppose movement of the ring from its neutral position and which increase progressively as the extent of such movement increases. The spring should not exert any substantial retarding forces on the ring in its neutral position for there the ring should float freely.

Bracket 13 is also provided with a downwardly extending arm terminating in a spherical end 25 which has a limited amount of free movement in one plane in aperture 26 of solenoid armature 27. The armature 27 includes oppositely extending arms 28 and 29, projecting respectively into electrical coils 30 and 31. When coil 30 is energized the arm 28 of the armature is drawn into the coil and a wall of opening 26 engages ball 25 moving it with the armature and thereby rotating the gimbal ring 7 against the tension afforded by spring 15. When coil 30 is de-energized spring 15 contracts and returns ball 25 and the armature 27 to their respective original positions. A similar operation takes place when coil 31 is energized and de-energized. By adjusting the position of block 16 on rod 17 the position of ball 25 may be shifted to either side from its position shown in Fig. 4, thereby precessing the ring 7 a corresponding amount.

Figures 3, 4:
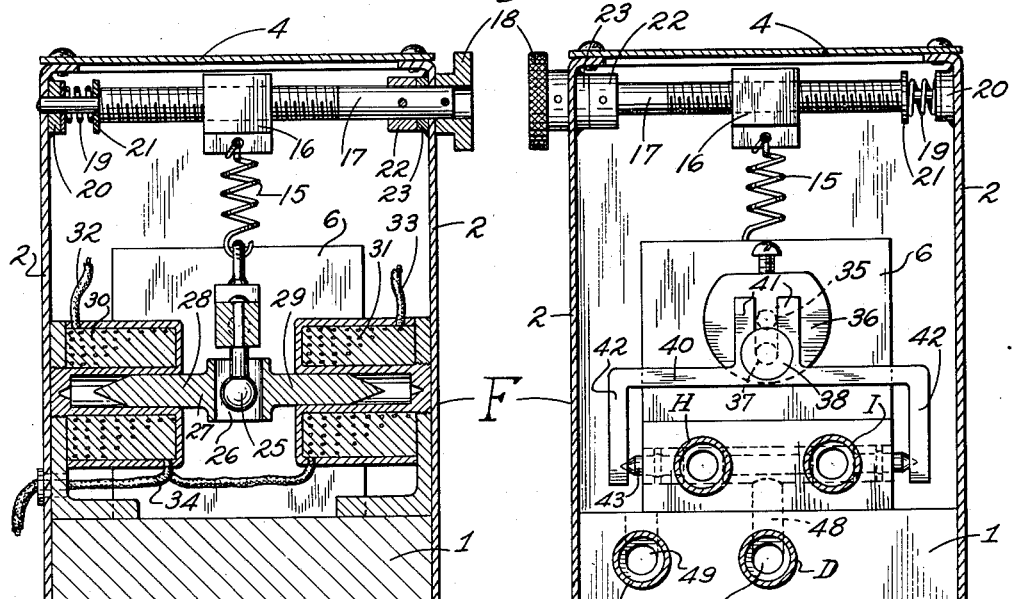
Figure 3 is a transverse view, partly in section, taken on lines 3—3 of Fig. 2.
Figure 4 is a transverse sectional view taken on line 4—4 of Fig. 2.

Coils 30 and 31 may be separately energized by passing direct current from a source Q thru a switch R and then thru either leads 32 or 33 and back to Q thru the return head 34, as is better shown in Figs. 1 and 4.

The other shaft-like extension 35 of rotor 7 carries at its outer end a disc-like bracket 36 provided with a pin 37 in the lower portion thereof. This pin has an enlarged head 38 and carries a washer 39. A yoke 40 has upstanding prongs 41 which are disposed on opposite sides of pin 37 between head 38 and washer 39 which engage the opposite ends of the endwise movable member 43 which may slide in either direction in housing 44. The slide member 43 is rod-like in shape with enlarged cylindrical portions 45 thereon on opposite sides of its transverse center line and with other mutilated cylindrical portions 46 between portions 45 and the ends of the member 43. The housing 44 is open at each end and its interior has circumferential recesses, as at 47, said recesses communicating thru passages in the housing with pipe lines H and I respectively. The space in housing 44 between recesses 47 communicates thru a passage 48 with passage 10 in the base of the gyroscope housing and thus communicates with pipe line D.

When the ring 7 of the gyroscope is precessed, as by deviation from a straight course or is rotated either manually or electrically by energizing coil 30 or 31, bracket 36 rotates with ring 7 and pin 37 shifts yoke 40 in the direction of rotation of ring 7. Assuming that ring 7 is rotated (by whatever means) so that yoke 40 is shifted to the left in Figs. 3 and 5, member 43 is moved endwise toward the left, thereby shifting the lefthand cylindrical portion 45 to open the adjacent recess 47 to communicate with passage 48 and to open the righthand recess 47 to communicate with the interior of the gyroscope housing thru the open end of member 44. With the parts in that position fluid under pressure may flow thru passage 48 and into the lefthand recess 47 and thence thru pipe line H. At the same time liquid in pipe line I may escape thru the righthand recess 47 and out thru the open end of member 44. In doing so the liquid engages with the mutilated member 46 near the righthand end of member 43 and due to frictional drag tends to move the member 43 back to the position shown in Fig. 5. Liquid flowing out of the end of housing 44 into the interior of the gyroscope housing may escape thru passage 49 which communicates with pipe G of Fig. 1.

In Fig. 6 the auto by-pass K of Fig. 1 is shown as consisting of a cylinder 50 which constitutes a connection between the two parts of pipe line H and also between the two parts of pipe line I. The interior of the cylinder 50 is provided with a plunger 51 which has an intermediate piston 52 and two end pistons 53 thereon. One end of the cylinder 50 communicates thru pipe line L with pipe D so that when liquid under pressure enters cylinder 50 thru line L it moves plunger 51 toward the right to approximately the position shown in Fig. 6, and compresses spring 54 which is disposed between the opposite end of cylinder 50 and the adjacent end of piston 53. With the plunger 51 in the position shown in Fig. 6, fluid may flow from one part of pipe H thru the by-pass to the other part of that pipe and into the servo-motor cylinder J and may also flow from that cylinder to one part of the pipe I thru the by-pass and into the other part of pipe I. When the fluid pressure in line L is diminished or removed, as by opening valve M, spring 54 moves plunger 51 endwise until the space between piston 52 and the righthand piston 53 communicates with and connects both ends of both pipes H and I. The piston 53 carries a packing ring 55 to prevent passage of fluid into the space in which spring 54 is located. Drain opening 56 is provided in cylinder 50 to permit the escape of any liquid which enters the space occupied by spring 54.

The servo-motor J is of standard, well known construction and consists of a cylinder 60 having a piston 61 therein and connected to a shaft 62. Pipe line H is connected to one end of cylinder 60 while line I is connected to the other end, so that liquid under pressure in one of these lines may be delivered into the cylinder on one side of piston 61 to move the piston 61 toward the other end of the cylinder with coincident flow of liquid out of the latter end of the cylinder into either line H or I, as the case may be. The rod J may be connected in any well known manner to a steering member, such as pivotally mounted rudder, aileron or elevator, as by any suitable means such as the clevis 63.

Assuming that the apparatus of Fig. 1 is installed in a boat and is to operate automatically to move the rudder about its pivot to maintain the boat on a substantially straight course, the operation of the apparatus of Fig. 1 is substantially as follows: The valve M is closed so that liquid cannot pass therethru and the pump C is actuated to build up and maintain liquid pressure in line D. Liquid is continuously discharged from pipe D thru passage 10 and outlet 11 of nozzle 9 against the periphery of gyro rotor 8, thereby rotating the latter. The speed of rotation of rotor 8 will depend on the pressure exerted on the liquid in line D and on the velocity of the liquid discharged from nozzle 9.

Figure 2:
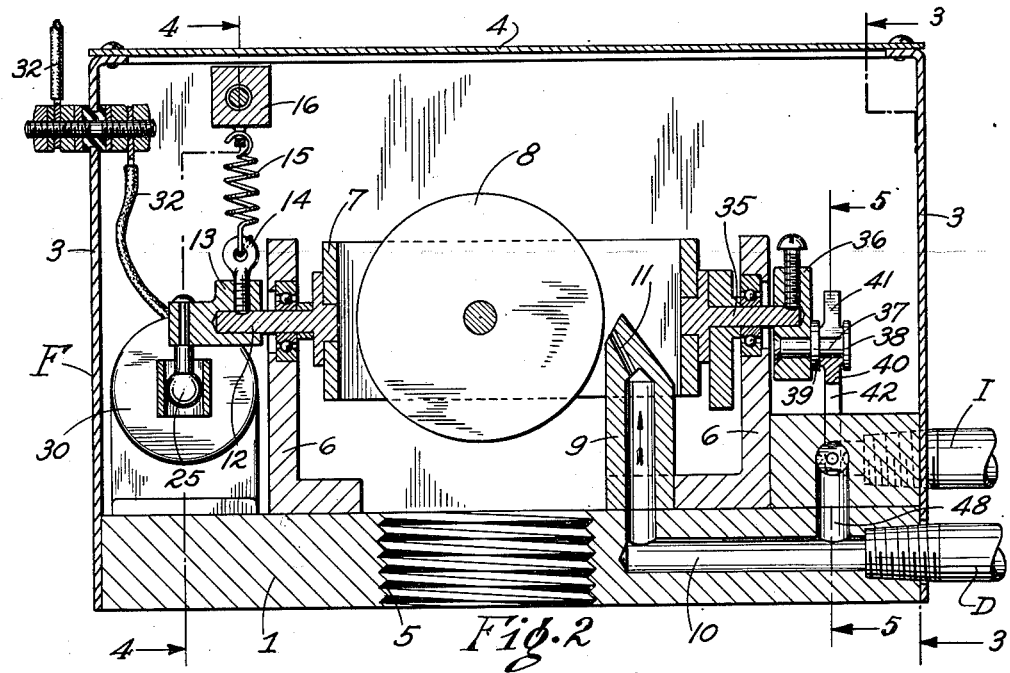
Figure 2 is a central, longitudinal, cross-sectional view thru a gyroscope of this invention in which the rotor is actuated by liquid traveling at high velocity.

So long as gyro ring 7 remains in substantially the position shown in Figs. 2, 3 and 5, that is in approximately neutral position, valve member 43 will remain in substantially the position shown in Figs. 3 and 5 and altho there will be liquid under pressure in passage 48 and between cylindrical portions 45 on that valve member, there will be substantially no flow of such liquid into either pipe line H or I. The liquid pressure in line L will maintain the plunger 53 of the auto by-pass in substantially the position shown in Fig. 6 and there will be substantially the same liquid pressure on opposite sides of plunger 61 in cylinder 60 of the servo-motor, with the result that the rudder will be maintained in one position. When, however, the gyro ring 7 precesses or is rotated in either direction the valve member 43 will be shifted to a corresponding extent, thereby permitting liquid under pressure to flow from passage 48 into either pipe line H or I, as the case may be, and thence thru by-pass K into one end or the other of cylinder 60 where it will move the piston 61 in a corresponding direction and shift the rudder from its initial position at a rate and to an extent proportional to the extent of precessing of the gyro ring 7. While liquid is flowing from passage 48 into one recess 47, liquid will also be flowing from the other recess 47 and past the adjacent multilated portion 46. This flow tends to restore valve 43 to its initial position. At the same time spring 15 tends to return the ring to neutral position and thereby to restore the valve to its neutral or initial position. The action of the gyro itself also tends to return the ring to its neutral position and thereby to restore the valve to its neutral position. As a result of these three simultaneously acting forces the rudder is locked in its new position as soon as the ring is returned to its neutral position and remains there until shifted as a result of another rotation of the ring by precession or by being rotated. If, however, the ring is returned to a point beyond its initial or neutral position the valve 43 will be shifted correspondingly and high pressure liquid will flow from passage 48 thru the thereby opened line H or I, as the case may be, with the result that the piston 61 will be correspondingly shifted and the rudder will be correspondingly turned. Since various factors, such as the torsional effect of the boat propelling screw, the effect of waves, or the shifting of weight in the boat will cause precessing of the gyro ring in one direction or another, the ring is almost constantly precessing in one direction or the other and consequently the rudder is being almost continually pivoted in accordance with such precessing. However, such precessing of the ring is usually slight in amount and consequently the course along which the boat is propelled is substantially straight.

If at any time it be desired to change the course of the ship this may be done by energizing the appropriate coil 30 or 31 and thereby rotating ring 7 in the desired direction and thereby pivoting the rudder to bring the ship onto the new desired course. When the ship has been brought onto that course the coil is deenergized, after which the gyro takes and maintains control as above described until it is again rotated manually or electrically.

If it should be desired to steer the boat mechanically for a time, the valve M may be opened, thereby relieving the pressure in line L and permitting the spring 54 to expand so that both ends of lines H and I will be connected in cylinder 50. When that condition exists the rudder may be freely pivoted mechanically because the liquid pressure on opposite sides of piston 61 in cylinder 60 is equal and thus the piston may be moved freely in its cylinder and fluid can flow readily thru lines H and I from one side of the piston to the other side when the steering member pivoted to shaft 62 is actuated by manual means.

In Fig. 7 I have shown diagrammatically apparatus which embodies the present invention and which is suited for controlling a rudder, an aileron and an elevator of an airplane. As in Fig. 1, this apparatus consists of a hydraulic system, including the general parts thereof as described above, but unlike Fig. 1, which shows only one direction control unit, this apparatus includes a plurality of direction controlling mechanism units. Each of these units is constructed substantially as described in connection with Fig. 1. Accordingly, it will be understood that the parts of Fig. 7 which bear reference letters or numerals are substantially the same in construction and operation as the correspondingly identified parts of Fig. 1. It will be noted that between tank A and pump C in Fig. 7 an oil filter O is interposed. It will also be noted that the gyro units F of Fig. 7 are positioned differently so as to locate the gyro ring in the plane which is proper for control of the particular steering member with which it is associated. For example, the lefthand gyro assembly is positioned with its ring in a horizontal plane and the axis of the ring extending along the fore and aft line of the ship for control of the rudder; the middle gyro assembly is positioned with the gyro ring in a vertical plane and with the axis of the ring extending transversely of the fore and aft line of the ship for control of an aileron, and the righthand gyro assembly is positioned with the gyro ring in a vertical plane and with the ring axis extending fore and aft of the ship to control an elevator.

I have found that it is not necessary to balance dynamically the rotor of a gyroscope of the two degree freedom type when the rotor is to be propelled by a liquid, preferably oil. Apparently the liquid clings to the periphery of the rotor and compensates for any lack of dynamic balance of the rotor. I have successfully operated such gyros provided with rotors which had been statically, but not dynamically, balanced and have found that when these rotors were rotated by means of liquid traveling at high velocity the rotors seem to run as smoothly as if they had been dynamically balanced within close limits.

Rotor actuating liquids of various kinds may be used provided they have the property of clinging to the periphery of the rotor and improving its dynamic balance. It will be understood that the amount of unbalance largely determines the viscosity of the liquid which may be used, for when the amount of unbalance is small liquids with low viscosity, such as water, alcohol and the like, may be used, while liquids of greater viscosity, such as SAE-10 to SAE-40 lubricating oils may be required when the amount of unbalance is large. Other factors to be considered in selecting a liquid are the speed of the rotor and the preservation of the bearings and pivots against wear and corrosion. Many rotors do not exceed about 2" in diameter and have speeds of about 10,000 R. P. M. Any of the foregoing liquids may be used with such a rotor, dependent of course on the amount of unbalance. When it is important to prevent corrosion or wear of the bearings and pivots a lubricating oil should be used instead of water, alcohol or some other liquid which would not prevent corrosion. I have been able to reduce the unbalance of a 2" rotor operating at 10,000 R. P. M. from 100 microounce inch to about 5 microounce inch, using water as the liquid, and have reduced the unbalance of such a rotor from 500 microounce inch to 5 microounce inch, using SAE-20 lubricating oil. These illustrations will show the wide range of liquids which may be used under varying conditions to improve the dynamic balance of a rotor according to this invention.

Having thus described my invention so that others skilled in the art may be able to understand and practice the same, I state that what I desire to secure by Letters Patent is defined in what is claimed.

What is claimed is:

1. Control apparatus comprising a gyroscope of the two degree freedom type and including a rotatable ring and a rotor, a servo-motor, a direction control member connected for actuation to said motor, means including a source of liquid under pressure for rotating said rotor, said liquid being of such a nature as to cling to and improve the dynamic balance of said rotor, means to direct such liquid against the periphery of said rotor to rotate the latter, and means for actuating said member including an endwise movable valve for selectively and progressively connecting said source with either side of said motor and means movable endwise by rotation of the ring for shifting said valve endwise at a rate and to an extent proportionate to the extent of rotation of said ring.

2. Control apparatus comprising a gyroscope of the two degree freedom type including a rotatable ring and a rotor, a servo-motor, a direction control member actuated by said motor, and means including a source of liquid under pressure for rotating said rotor and actuating said motor, said liquid being of such a nature as to cling to said rotor and improve the dynamic balance thereof, said means including a nozzle disposed to direct said liquid at high velocity against the periphery of said rotor, and a slide valve movable endwise by rotation of said ring for admitting said liquid under pressure into one side or the other of said motor.

BERT G. CARLSON.

REFERENCES CITED

The following references are of record in the file of this patent:

UNITED STATES PATENTS

| Number | Name | Date |
| --- | --- | --- |
| 2,272,986 | Weinkauff | Feb. 10, 1942 |
| 2,195,406 | Carlson | Apr. 2, 1940 |
| 2,325,108 | Carlson | July 27, 1943 |
| 1,382,372 | MacFarlane et al. | June 21, 1921 |
| 2,011,453 | Moller | Aug. 13, 1935 |
| 1,592,081 | Colvin | July 13, 1926 |
| 1,975,740 | Brown | Oct. 2, 1934 |
| 509,644 | Bardsley | Nov. 28, 1893 |
| 2,201,226 | Carlson | May 21, 1940 |

FOREIGN PATENTS

| Number | Country | Date |
| --- | --- | --- |
| 501,945 | Great Britain | Mar. 8, 1939 |